United States Patent Office 3,393,174
Patented July 16, 1968

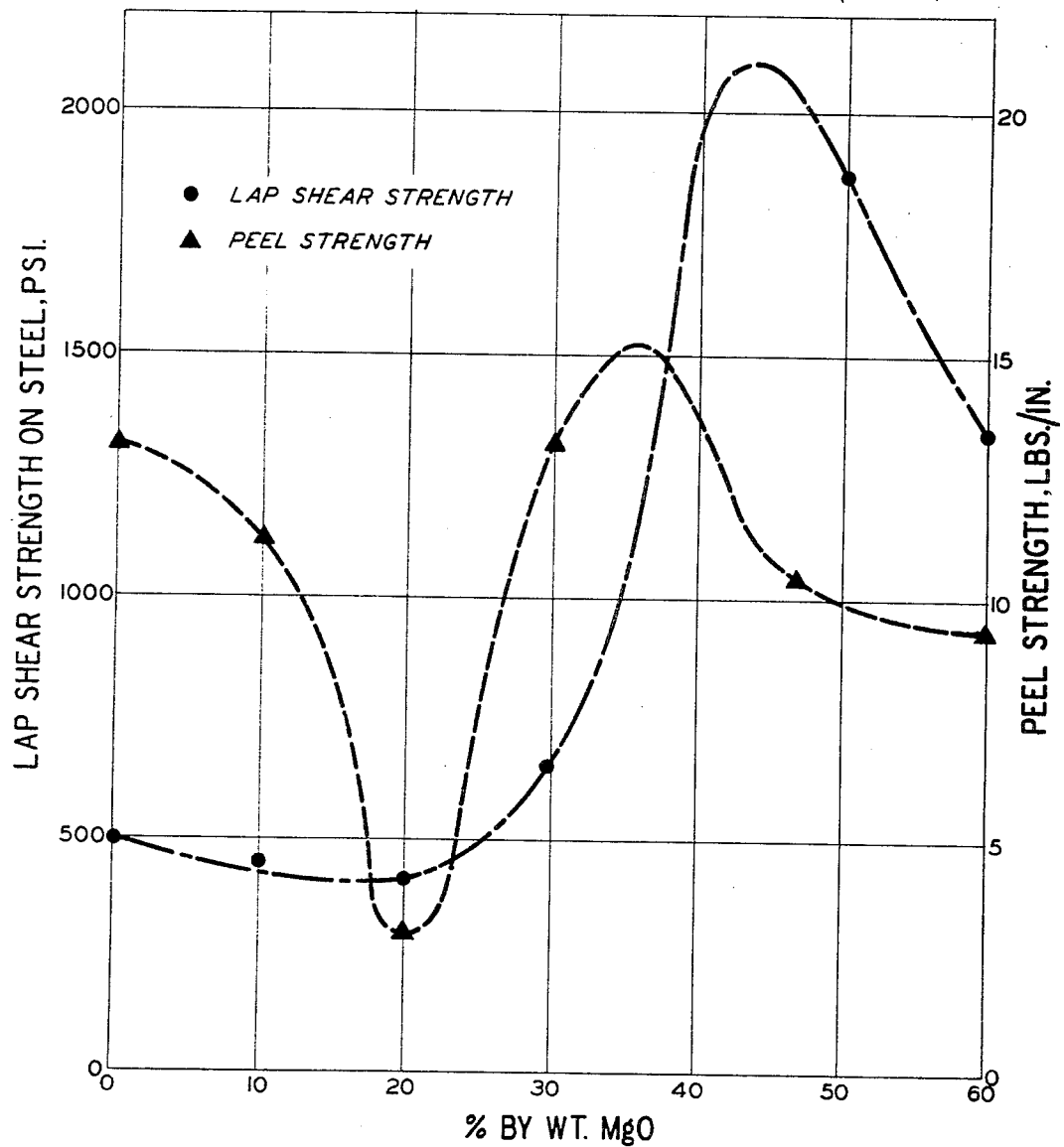

3,393,174
HOT MELT ADHESIVE COMPOSITION
George H. Potter, St. Albans, and Clyde J. Whitworth, Jr., Charleston, W. Va., and Nathan L. Zutty, Westfield, N.J., assignors to Union Carbide Corporation, a corporation of New York
Filed Sept. 17, 1965, Ser. No. 488,086
8 Claims. (Cl. 260—41)

ABSTRACT OF THE DISCLOSURE

The lap shear and peel strengths of the vinyl polymers, such as, polyvinyl acetate, ethylene/vinyl acetate copolymers, ethylene/acrylic acid copolymers and ethylene/ethyl acrylate copolymers were enhanced by blending these vinyl polymers with 30 to 50% by weight of iron oxide or oxides of elements of Group II-A of the Deming Periodic Table. The resultant compositions can be used for bead-sealing, metal joining, laminating and the like.

---

This invention relates to hot melt adhesive compositions comprising a vinyl polymer and an oxide filler.

Various vinyl polymers exhibit satisfactory adhesive properties but suffer in competition with glues and other natural adhesives because of their higher cost. Attempts to lower the cost of vinyl polymer adhesives by addition of cheaper fillers usually results in sacrifice of the original adhesive strength as demonstrated by lower lap shear and peel strengths.

It has now been unexpectedly discovered that hot melt adhesive compositions comprising vinyl polymers, such as olefin polymers or polyvinyl esters and from about 30 to about 50 percent by weight of oxides of iron or members of Group II-A of the Deming Periodic Table, have higher lap shear and peel strengths than compositions containing only the olefin polymers or polyvinyl esters without an oxide filler.

This observation is quite unexpected from the teachings of the prior art and would not be apparent to a researcher skilled in the art conducting methodical screening tests of fillers because as shown in the figure, where the effect on lap shear and peel strength of an ethylene/vinyl acetate (72:28) copolymer is plotted against weight percent of MgO in the adhesive composition, additions of up to about 20% of MgO cause a progressive drop in both of these physical properties. But surprisingly, at about 30% of MgO this trend is reversed and these properties are enhanced over the values of the unfilled polymer. It was then further discovered that although the lap shear and peel strengths increase upon further additions of MgO beyond this 30% level, there is a maximum reached beyond which these physical properties again begin to decrease. For practical purposes an upper limit of about 50% of MgO is set at which point a cheaper hot melt adhesive composition is afforded with satisfactory physical properties.

The olefin polymers used in this invention are copolymers of an α-olefin with a vinyl comonomer. The preferred vinyl comonomers are vinyl esters such as vinyl acetate, vinyl propionate and the like and acrylic acids or alkyl esters such as acrylic acid, $CH_2=CHCO_2H$, methacrylic acid, $$CH_2=C-CO_2H$$
$$\phantom{CH_2=C-}|$$
$$\phantom{CH_2=C-}CH_3$$

methyl acrylate, methyl methacrylate, ethyl acrylate, ethyl methacrylate and the like.

The preferred α-olefin is ethylene although others such as propylene and butene-1 and the like can also be used if desired. Homopolymers of the vinyl esters referred to above can also be employed as the vinyl polymer of the instant hot melt adhesive compositions.

The α-olefin content of the olefin polymers is at least 60% of the total copolymer. Where vinyl esters are utilized as comonomers with α-olefins they constitute at least 10% by weight of the total copolymer and preferably about 18% to 40% by weight. Where acrylic acids or alkyl esters are utilized as the comonomers with α-olefins they are preferably present in an amount constituting at least about 5% by weight and preferably about 10% to 30% by weight of the total copolymer.

Among the fillers that are useful in these hot melt adhesive compositions can be mentioned zinc oxide, barium oxide, magnesium oxide, calcium oxide, lead oxide ($Pb_3O_4$), ferric oxide, carbon black, hydrated silica, hydrated magnesium aluminum silicate and the like. It is preferred to use oxides in these adhesive compositions and of these magnesium oxide, MgO, and ferric oxide, $Fe_2O_3$, are particularly preferred in an amount constituting between about 30 and 50% by weight of the total composition.

Any conventional mixing equipment such as Banbury mixers or 2 roll mills can serve to blend the vinyl polymer and fillers to the desired composition. For this operation temperature and pressure are not critical although standard temperature and pressure are preferred for convenience.

All commercially available metals commonly used for laminating can be bonded with the hot melt adhesive compositions of this invention. Aluminum and steel are preferred metals because of the frequency of their use in the fabrication of laminates although other metals such as brass, copper, tin, lead, zinc and the like are also amenable to bonding with these adhesive compositions. The bonded substrate need not be metallic but may instead be thermoplastic polymers as for example, polyethylene, polypropylene, polymethyl methacrylate, or thermoset polymers such as epoxy resins, polyurethanes, phenol-aldehyde condensation products, melamine resins and the like.

The invention is further described by the examples which follow in which all parts and percentages are by weight unless otherwise specified.

EXAMPLES 1–5

An ethylene/vinyl acetate (72/28) copolymer was blended in five examples with 10, 20, 30, 50 and 60 parts respectively, of magnesium oxide, MgO. Steel specimen pairs 1" x 6" x 0.26" were then bonded at 180° C. and 500 p.s.i.g. with these ethylene/vinyl acetate copolymers-MgO blends and their lap shear and peel strengths measured. These data are presented in Table I together with that of a Control consisting of steel specimens bonded with unfilled ethylene/vinyl acetate copolymer, that is, containing no MgO. A continuous plot of these data, percent MgO vs. lap shear and peel strength, indicates a useful range from about 30–50% and an optimum filler content between 35 and 45%.

A description of the tests for lap shear and peel strength follows.

(I) *Lap shear strength*

(a) *Preparation of samples.*—A portion of either a pressed polished or milled plastic sheet was placed between one inch precleaned steel (cross-sectional area=0.026 sq. in.) or aluminum (cross-sectional area=0.044 sq. in.) paint panels which in turn were placed between two chrome plates. The chrome plates were shimmed so as to give uniform coatings of plastic on the metal. These plates were then placed in a press and allowed to come to the desired temperature. The desired pressure was then applied for 1 min. followed by cooling.

(b) *Measurement.*—The values for lap shear were measured by determining, on an Instron, the force required to break the bond. The rate of extension was 10 percent per minute. The force divided by the area of the bond gives the lap shear in pounds per square inch.

(II) *Peal strength*

(a) *Preparation of samples.*—A strip of either a pressed or milled sheet of plastic was placed on a 1 x 5 inch strip of precleaned steel or aluminum and placed between Teflon coated glass. This in turn was placed between shimmed plates and placed in a press. The desired pressure was applied for one minute after the temperature had reached the desired level.

(b) *Measurement.*—The peel strength was measured at 180° bend by use of a Hunter spring gage which reads in pounds. The values obtained are an average of at least six measurements on the same sample and are reported in lbs. per inch of sample width.

TABLE I.—LAP SHEAR AND PEEL STRENGTH OF MgO FILLED ETHYLENE/VINYL ACETATE (72:28) COPOLYMER ON STEEL

| Example No. | Percent MgO | Lap Shear Strength, p.s.i. | Peel Strength, lbs./in. |
|---|---|---|---|
| Control 1 | 0 | [1] 498 | 146.1 |
| 1 | 10 | [1] 440 | [2] 11.2 |
| 2 | 20 | [1] 405 | 3.0 |
| 3 | 30 | [1] 650 | 13.1 |
| 4 | 50 | [3] 1,870 | 11.4 |
| 5 | 60 | [3] 1,340 | 10.4 |

[1] 1″ overlap.   [2] 150° C.   [3] ½″ overlap.

EXAMPLES 6–13

The effect of varying bond pressures on bonding steel panels 1″ x 6″ x 0.026″ at 150° C. with ethylene/vinyl acetate (72:28) copolymer and vinyl acetate homopolymer filled with a series of fillers was evaluated by measuring their relative lap shear strengths at 23° C. The following controls were also included in this evaluation:

Control 2, unfilled ethylene/vinyl acetate (72:28) copolymer; Control 3, unfilled vinyl acetate homopolymer, and Control 4, unfilled ethylene/vinyl acetate (82:18) copolymer. The data obtained are presented in Table II.

TABLE II.—STEEL LAP SHEAR STRENGTH OF FILLED VINYL ACETATE POLYMERS

| Example No. | Resin | Filler, percent | Lap Shear, p.s.i. 23° C.[1], Bond Preparation Pressure 150° C. | | |
|---|---|---|---|---|---|
| | | | 80 p.s.i.g. | 500 p.s.i.g. | 1,000 p.s.i.g. |
| 6 | A | ZnO (50) | 533 | 490 | 625 |
| 7 | A | Fe₂O₃ (50) | 940 | 900 | 820 |
| 8 | A | BaO (50) | 640 | 590 | 585 |
| 9 | A | Attagel 30 [2] (50) | 870 | 1,070 | 900 |
| 10 | A | Hi-Sil 233 [3] (50) / Benzoflex 998 [4] (20 PHR) | 510 | 730 | 810 |
| 11 | A | MgO (50) | 1,140 | 1,280 | 1,070 |
| 12 | A | Pb₃O₄ (50) | 615 | 345 | 445 |
| 13 | A | Hi-Sil 233 [3] (50) | | 1,030 | |
| 14 | A | Carbon black (30) | | [6] 144 | |
| Control 2 | A | | 605 / [6] 498 | 505 | |
| 14a | B | Hi-Sil 233 (40) | | 190 / [6] 250 | |
| 14b | B | MgO (40) | | [7] 1,380 | |
| Control 3 | B | | | [5] 1,220 / [7] 1,310 | |
| Control 4 | C | | | [6] 750 | |

[1] All measurements for a one-inch overlap unless otherwise designated.   [2] Trademark of a hydrated magnesium aluminum silicate.   [3] Trademark of a hydrated silica (87% SiO₂, 0.5% CaO, 0.2% Fe₂O₃, 0.6% Al₂O₃; 1% NaCl).   [4] Trademark of dibenzoate esters of glycols in parts per hundred of resin.   [5] ½ inch overlap.   [6] 180° C.   [7] 120° C.

A=Ethylene/vinyl acetate (72:28) copolymer; B=Polyvinyl acetate; C=Ethylene/vinyl acetate (82:18) copolymer.

EXAMPLES 15–36

The effects of varying amounts of MgO and Fe₂O₃ as fillers in ethylene/vinyl acetate (72:28) copolymer bonded 2024–T3 aluminum panels 1″ x 6″ x 0.044″ were measured in terms of lap shear and peel strength, as shown in Table III. Steel panels 1″ x 6″ x 0.026″ were also bonded with ethylene/vinyl acetate (72:28) copolymer filled with varying amounts of Attagel 30 (trademark for a hydrated magnesium aluminum silicate) and Hi-Sil 233 (trademark for a hydrated silica). Comparative data for these examples are also contained in Table III.

TABLE III.—LAP SHEAR AND PEEL STRENGTH OF FILLED ETHYLENE/VINYL ACETATE (72:28) COPOLYMER

| Example No. | Metal | Filler, Percent | Lap Shear, p.s.i. 23° C.[1] | | | Peel Strength Lbs./ In. of Width | |
|---|---|---|---|---|---|---|---|
| | | | Bond Preparation Temperature 500 p.s.i.g., ° C. | | | | |
| | | | 120° C. | 150° C. | 180° C. | 150° C. | 180° C. |
| 15 | Steel | Fe₂O₃ (10) | | | 285 | | 8.0 |
| 16 | do | Fe₂O₃ (20) | | | 400 | | 1.8 |
| 17 | do | Fe₂O₃ (30) | | | 560 | | 8.4 |
| 18 | do | Fe₂O₃ (50) | | | 1,345 / [2] 1,685 | 12.4 | |
| 19 | do | Fe₂O₃ (60) | | | 1,020 | | 7.6 |
| Control 5 | do | | 190 | 505 | 498 | 8.2 | 13.1 |
| 20 | Aluminum | MgO (10) | | | 70 | 3.1 | |
| 21 | do | MgO (20) | | | 124 | [3] 0.7 | |
| 22 | do | MgO (30) | | | 180 | [3] 0.7 | 1.6 |
| 23 | do | MgO (50) | | | 1,090 | 5.2 | 10.4 |
| 24 | do | MgO (60) | | | 790 | 1.3 | 4.5 |
| 25 | do | Fe₂O₃ (10) | | | 28 | | 1.8 |
| 26 | do | Fe₂O₃ (20) | | | [4] 142 | | 1.0 |
| 27 | do | Fe₂O₃ (30) | | | [4] 112 | | 1.2 |
| 28 | do | Fe₂O₃ (50) | | | 1,070 | 5.2 | |
| 29 | do | Fe₂O₃ (60) | | | 300 | | 2.6 |
| Control 6 | do | | | 450 | | [3] 8.2 | 12.7 |
| 30 | Steel | Attagel 30 (10) | | | 20 | 1.7 | |
| 31 | do | Attagel 30 (30) | | | 655 | 4.4 | |
| 32 | do | Attagel 30 (50) | | 1,070 | [2] 1,230 | 12.7 | |
| 33 | do | Hi-Sil 233 (10) | | | 14 | 0.4 | |
| 34 | do | Hi-Sil 233 (20) | | | 250 | 1.5 | |
| 35 | do | Hi-Sil 233 (30) | | | 620 | 2.5 | |
| 36 | do | Hi-Sil 233 (50) | | [2] 1,030 | [2] 1,030 | 3.2 | |

[1] All measurements are for a one-inch overlap unless otherwise designated.
[2] ½ inch overlap.
[3] Pressure used for bond preparation was 80 p.s.i.g

EXAMPLES 37–50

The effects of MgO and $Fe_2O_3$ as fillers in the bonding of steel and aluminum panels 1″ x 6″ x 0.044″ with ethylene/vinyl acetate, ethylene/acrylic acid and ethylene/ethyl acrylate copolymers were also evaluated by lap shear strength measurements at 23° C. and 50° C. and peel strength measurements at room temperature. The data obtained are shown in Table IV.

The hot melt adhesive compositions of this invention are particularly useful for the preparation of metal to metal or metal to olefin polymer laminates, bead-sealing, metal joining and the like.

Although the invention has been described in its preferred forms with a certain degree of particularity, it is understood that the present disclosure has been made only by way of example, and that numerous changes can be

TABLE IV.—LAP SHEAR AND PEEL STRENGTHS OF FILLED ETHYLENE-ACRYLIC COPOLYMERS

| Example No. | Metal | Resin | Filler, (Percent) | Lap Shear, p.s.i.[1] 23° C., Bond Preparation Pressure 180° C. 80 P.s.i.g. | 500 P.s.i.g. | 50° C., 500 P.s.i.g. | Peel Strength, lbs./In. of Width |
|---|---|---|---|---|---|---|---|
| Control 7 | Steel | E | | 2,650 | [2] 1,340 | [2] 16.7 | |
| Control 8 | Aluminum | E | | [2] 1,860 | [2] 1,240 | [2] 26.3 | |
| 37 | Steel | D | $Fe_2O_3$ (50) | 1,500 | 390 | [2] 12.4 | |
| 38 | Aluminum | D | $Fe_2O_3$ | 1,070 | | [2] 5.2 | |
| 39 | Steel | E | MgO (30) | 1,100 | 1,570 | 72 | |
| 40 | do | E | MgO (40) | 1,520 | 850 | 1.05 | |
| 41 | do | E | $Fe_2O_3$ (30) | 2,560 | 1,500 | 29.8 | |
| 42 | do | E | $Fe_2O_3$ (40) | 2,650 | 1,920 | 21.5 | |
| 43 | do | F | MgO (30) | 80 | | 8.3 | |
| 44 | do | F | MgO (40) | 1,000 | | 16.6 | |
| 45 | do | F | $Fe_2O_3$ (30) | 320 | | 3.1 | |
| 46 | do | F | $Fe_2O_3$ (40) | 380 | | 6.9 | |
| 47 | Aluminum | E | MgO (30) | 860 | 500 | .7 | |
| 48 | do | E | MgO (40) | 185 | 140 | 1.2 | |
| 49 | do | E | $Fe_2O_3$ (30) | 2,125 | 1,630 | 15.2 | |
| 50 | do | E | $Fe_2O_3$ (40) | >2,125 (3) | 1,900 | Stuck[4] | |

[1] ½-inch lap.  [2] 150° C. (Bond preparation temperatures).  [3] Al broke.  [4] The material could not be peeled off without breaking. Peel strength would be >30 lbs./in. of width.

D=An ethylene-vinyl acetate copolymer containing 28 wt. percent vinyl acetate.
E=Ethylene-acrylic acid copolymer containing 13 wt. percent acrylic acid.
F=Ethylene-ethyl acrylate copolymer containing 18 wt. percent ethyl acrylate.

EXAMPLES 51–52

The peel strength of ethylene/vinyl acetate (72:28) compositions containing 50% by weight of $Fe_2O_3$ or MgO bonded to low density polyethylene was also measured and compared with Control 8 containing no filler. These data are presented in Table V.

TABLE V.—PEEL STRENGTH OF FILLED COPOLYMER COMPOSITIONS ON POLYETHYLENE [1]

| Example | Copolymer | Filler Wt., percent | Peel Strength, lbs./inch of Width |
|---|---|---|---|
| Control 8 | (2) | | 16.1 |
| 50 | (2) | 50% $Fe_2O_3$ | 15.0 |
| 51 | (2) | 50% MgO | 12.2 |

[1] Bond prepared at 180° C. and 500 p.s.i.g.
[2] Copolymer of ethylene and vinyl acetate containing 28 wt. percent vinyl acetate.

EXAMPLES 53–54

The lap shear strengths of 2024–T3 aluminum panels bonded with a low density polyethylene layer sandwiched in between by means of ethylene/vinyl acetate (72:28) copolymer containing 50 weight percent of MgO or $Fe_2O_3$ were measured. These data and Controls containing no filler are presented in Table VI.

TABLE VI.—LAP SHEAR STRENGTH OF ALUMINUM BONDED WITH LOW DENSITY POLYETHYLENE SANDWICHED BETWEEN FILLED COPOLYMER COMPOSITIONS [1]

| Example No. | Copolymer | Filler Wt., percent | Lap Shear Strength, lbs./sq. inch |
|---|---|---|---|
| Control 9 | (2) | | 775 |
| 52 | (2) | MgO | 1,300 |
| 53 | (2) | $Fe_2O_3$ | 1,330 |
| Control 10 | (3) | | 2,100 |

[1] Bond prepared at 180° C. and 500 p.s.i.g.
[2] Copolymer of ethylene and vinyl acetate containing 28 wt. percent vinyl acetate.
[3] Copolymer of ethylene and acrylic acid containing 13 wt. percent acrylic acid.

made without departing from the spirit and scope of the invention.

We claim:
1. Hot melt adhesive composition comprising:
   (a) vinyl polymers selected from the group consisting of polyvinyl acetate, ethylene/vinyl acetate copolymer, ethylene/acrylic acid copolymer, and ethylene/alkyl acrylate copolymer; and
   (b) from about 30 to 50% by weight of magnesium oxide.
2. The composition claimed in claim 1 wherein the vinyl polymer is polyvinyl acetate.
3. The composition claimed in claim 1 wherein the vinyl polymer is an ethylene/vinyl acetate copolymer.
4. The composition claimed in claim 1 wherein the vinyl polymer is an ethylene/acrylic acid copolymer.
5. The composition claimed in claim 1 wherein the vinyl polymer is an ethylene/alkyl acrylate copolymer.
6. Laminate consisting essentially of metal substrates bonded with the composition claimed in claim 1.
7. Laminate claimed in claim 6 wherein the metal is steel.
8. Laminate claimed in claim 6 wherein the metal is aluminum.

References Cited
UNITED STATES PATENTS 2,388,169  8/1945  McAlevy et al. _____ 260—41
2,628,214  2/1953  Pinkney et al. _____ 260—41
3,310,522  3/1967  Takahash et al. _____ 260—41

OTHER REFERENCES

Skeist, Handbook of Adhesives, Reinhold Publishing Corp., New York, 1964, page 484 relied on.

MORRIS LIEBMAN, *Primary Examiner.*

S. L. FOX, *Assistant Examiner.*